Jan. 19, 1960 MAO CHAO CHEN 2,921,737
MAGNETIC CORE FULL ADDER
Filed April 23, 1958
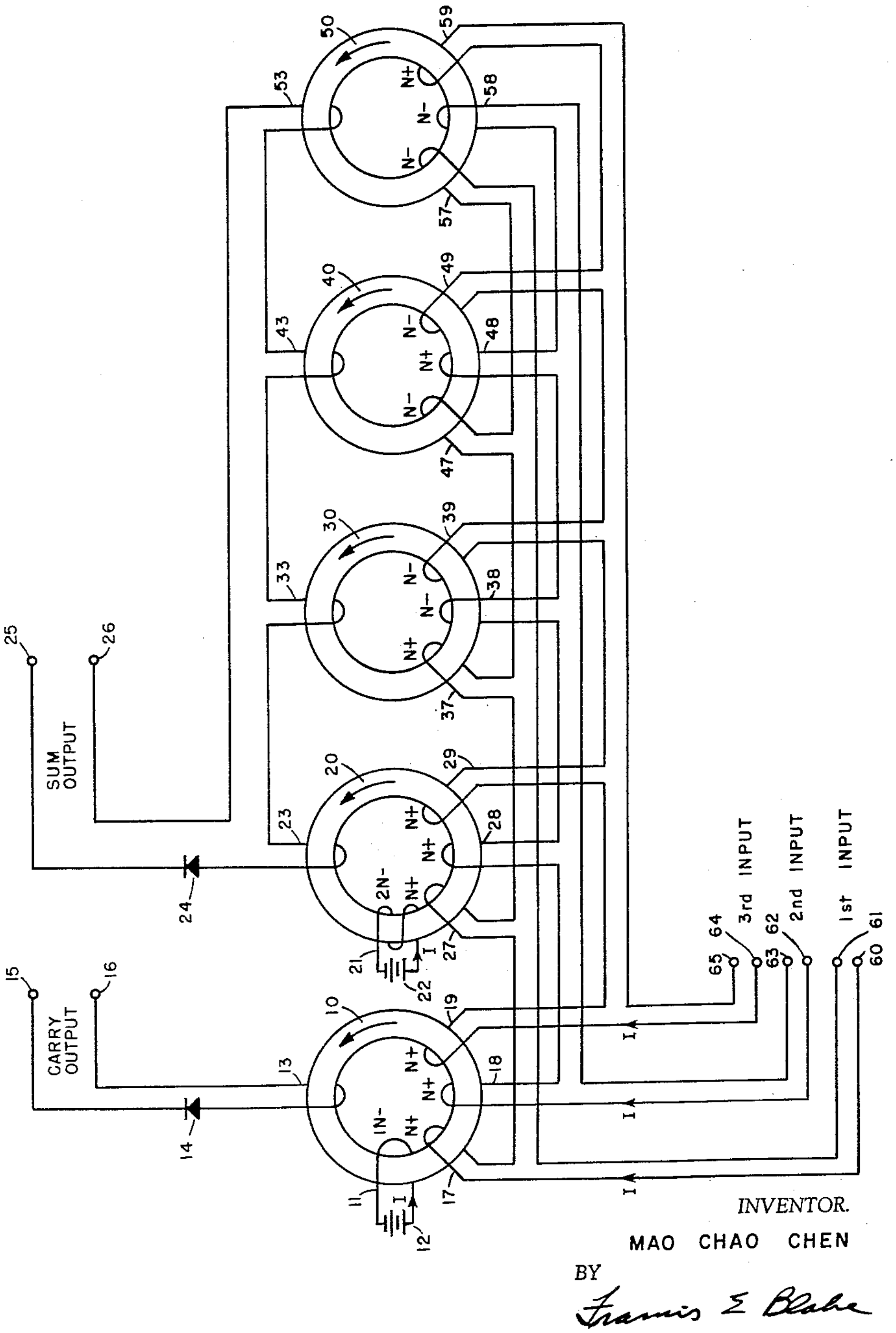
INVENTOR.
MAO CHAO CHEN
BY
Francis E. Blake
ATTORNEY United States Patent Office 2,921,737

Patented Jan. 19, 1960

2,921,737

MAGNETIC CORE FULL ADDER

Mao Chao Chen, Palo Alto, Calif., assignor to General Dynamics Corporation, Rochester, N.Y., a corporation of Delaware Application April 23, 1958, Serial No. 730,379

2 Claims. (Cl. 235—176)

This invention relates to electronic computer circuits and, more particularly, to magnetic core binary logic systems.

The value of small cores of magnetic material for use as storage and logical elements in electronic data handling systems is now well known. For example, so-called magnetic binary cores may be used to indicate or remember binary conditions, such as represented by the binary bit "1" or the binary bit "0."

The ordinary magnetic binary cores and circuits therefor are now so well known that they need no special description herein. However, for purposes of the present invention, it should be understood that such magnetic binary switching cores are capable of being magnetized to saturation in either of two directions. Furthermore, these cores are formed of magnetic material selected to have the so-called square hysteresis loop characteristic which assures that after the core has been saturated in either direction, a definite point of magnetic remanence representing the residual flux density in the core will be retained. The magnetic binary core elements are usually connected in circuits providing one or more input coils and output coils for purposes of switching the core from one binary condition corresponding to a particular direction of saturation to the other binary condition corresponding to the opposite direction of saturation and for indicating when the core switches from one condition of saturation to the other, respectively. The saturation can be achieved by passing a current pulse of sufficient magnitude through the input winding in a manner to create a surge of magnetomotive force in the magnetic core in the sense opposite to the preexisting flux direction, thereby driving the core to saturation in the opposite direction of polarity. While the core switches, a pulse will be induced in other windings on the core, such as, for example, the aforementioned output windings. The magnetic material for the core, as previously mentioned, is preferably one having a generally rectangular hysteresis characteristic and may be formed of various magnetic materials such as those known as "Mumetal," "Permalloy," or the ferromagnetic ferrites such as that known as "Ferramic."

Computer systems of the binary type may often use a so-called full adder as an element of the system. It is believed that a full adder is well known to those skilled in the art, but it may be briefly described herein as a device having three inputs and two outputs together with logic sensing arrangements to provide that the simultaneous application of binary bits to all three inputs will produce an output signal at one of the outputs; to provide that simultaneous application of two or more binary bits to two or more inputs will produce an output signal at the other output; and to provide that the application of only one binary bit at a time to any one of the inputs will produce an output signal at one of the outputs. Thus, the production of output signals at one or the other or both of the outputs indicates the logic of applied binary bits to the inputs.

It is the principal object of the present invention to provide a full adder employing magnetic cores with a simple arrangement of cores and coils.

It is another object of the invention to provide a magnetic core system having three input circuits and two output circuits arranged such that the application of an input signal to all three input circuits simultaneously will produce an output signal at one output circuit, and the application of two or more input signals to two or more of the input circuits will produce an output signal at the other output circuit, and the application of only one signal to only one of the input circuits at a time will produce an output signal at the one output circuit.

Further objects and advantages of the invention will be apparent with reference to the following specification and drawing in which is shown a preferred arrangement of the magnetic core full adder of the invention.

The magnetic core full adder may be comprised of a plurality of magnetic cores, such as the first core 10, the second core 20, the third core 30, the fourth core 40, and the fifth core 50. For purposes of the present description, it will be assumed that each of the cores 10, 20, 30, 40, and 50 may have a normal condition of magnetic remanence which may be referred to herein as the negative remanence, indicated by direction of arrows, and are capable of being switched to the other condition of remanence, which may be referred to herein as the positive remanence state. Furthermore, cores 10 and 20 are additionally biased to the negative state of remanence by the bias coil 11 for core 10 and the bias coil 21 for core 20. Bias batteries 12 and 22 are connected to the respective bias coils 11 and 21 to send a current I amperes through each of the coils in the direction shown. The magnitude I is such that a net NI amp-turns is enough to switch the core. It will be noted that bias coil 21 has twice the number of turns with reference to the bias coil 11. The reason for the above described bias and inductive relationship will be more clearly understood when the operation of the invention is explained.

Magnetic core 10 is provided with an output coil 13 connected in series with a rectifier diode 14 to output terminals 15 and 16. These output terminals 15 and 16 may be referred to as the carry output terminals when the full adder of the invention is associated with the input arrangements of other logic circuits or other magnetic core full adder circuits. Each of the second, third, fourth, and fifth magnetic cores 20, 30, 40, and 50, respectively, are provided with output coils 23, 33, 43, and 53, respectively, which are connected in series with each other and a rectifier diode device 24 to output terminals 25 and 26. The output terminals 25 and 26 may be referred to as the sum output terminals since with the arrangement of the invention to be described, the signals appearing thereacross are indicative of binary sum conditions for the binary bit input signals to be applied. Since the output coils 23, 33, 43, and 53 are connected in series with each other, in effect, a single or common output coil may be said to be associated with the cores 20, 30, 40, and 50.

The magnetic core 10 is provided with a first input coil 17, a second input coil 18, and a third input coil 19. The second magnetic core 20 is provided with a first input coil 27, a second input coil 28, and a third input coil 29. The third magnetic core 30 is provided with a first input coil 37, a second input coil 38, and a third input coil 39. The fourth magnetic core 40 is provided with a first input coil 47, a second input coil 48, and a third input coil 49. The fifth magnetic core 50 is provided with a first input coil 57, a second input coil 58, and a third input coil 59. The first input coils 17, 27, 37, 47, and 57 are connected in series with each other and to first input terminals 60 and 61. The second input coils 18, 28, 38, 48, and 58 are connected in series with each other and to second input terminals 62 and 63. The third input coils 19, 29, 39, 49, and 59 are connected in series with each other and to third input terminals 64 and 65.

For purposes of the present description, it will be understood that the inductive characteristics and relationship to the respective cores for each of the input coils is predetermined by providing the same number of coil turns N for each input coil on the related core and, furthermore, that each of the magnetic cores 10, 20, 30, 40, and 50 have the same size and magnetic characteristics. As shown in the figure, a current I flows from the input terminal. When that input is excited, N and I are so chosen that a net NI amp-turns is enough to switch a core. The input coils 17, 18 and 19 for core 10 are all wound in the same direction to apply magnetomotive force to the core 10 tending to switch the core 10 from the normal negative remanence state in the direction of the arrow to the positive remanence state when energized. Also, each of the input coils 27, 28, and 29 for core 20 are wound in the same direction in a manner to tend to switch the magnetic core 20 from the negative to the positive remanence state when energized. With reference to magnetic core 30, however, only the first input coil 37 is wound in the direction to tend to switch the core from the negative remanence state to the positive remanence state when energized so that unless the input coil 37 alone is energized, the core 30 will not switch from its normal negative remanence state. In the case of the magnetic core 40, only the second input coil 48 is wound in the direction to tend to switch the magnetic core 40 from the normal negative remanence state to the positive remanence state. In the case of the core 50, only the third input coil 58 is wound in the direction to tend to switch the core 50 from the normal negative remanence state to the positive remanence state. It is believed that the operation of the invention may now be readily understood.

When any of the magnetic cores 10, 20, 30, 40, or 50 switch from the normal negative remanence state to the positive remanence state, an output pulse will be induced in the respective output windings 13, 23, 33, 43, or 53. The rectifying diodes 14 and 24 are poled to pass the pulse induced in the output coils to the output terminals when any one of the cores switches from the negative remanence state to the positive remanence state. However, the pulse induced in the output coils 13, 23, 33, 43, or 53 when the respective core switches back from the positive remanence state to the normal negative remanence state will be blocked from the output terminals by the respective diodes 14 or 24. It is assumed that the binary bits to be added are current pulses applied to the respective input terminals 60, 61 or 62, 63 or 64, 65 and are of sufficient magnitude and direction as to switch any one of the cores from the normal negative remanence state to the positive remanence state if the related input coil is properly poled, that is to say, is wound in the proper direction as indicated by N+ on the drawing, and assuming that the core is not additionally biased in the negative remanence state by either the arrangement provided by the bias coil 11 for core 10 or the bias coil 21 for core 20. It will be further understood that the bias provided by the bias coil 11 for core 10 is selected to provide a magnetomotive force in the negative remanence direction equal to the positive magnetomotive force in the positive remanence direction as would be provided by the input binary bit pulse when connected to a single properly poled input coil. In the case of the bias winding 21 for core 20, the magnetomotive force in the negative remanence direction is chosen to be twice the magnetomotive force normally provided in the positive direction by the binary bit input pulse when connected to a single properly poled input coil.

Since the first, second, and third input coils 17, 18, and 19 for core 10 are all poled in the positive remanence direction opposing the magnetomotive force of the bias winding 11, the core 10 will switch from the negative to the positive remanence state when input pulses representing binary bits are simultaneously applied to two or more of the first, second, and third input coils 17, 18, and 19. Thus, an output pulse is induced in the output winding 13 for connection to the carry output terminals 15 and 16 when input pulses are simultaneously applied to two or more of the respective first, second, or third input terminals.

In the case of the magnetic core 20, three binary bit input pulses must be applied simultaneously to the input coils 27, 28, and 29 in order to oppose the magnetomotive force provided by the bias winding 21 and to switch the core 20 from the negative to the positive remanence state. Thus, when three input pulses or binary bits are simultaneously applied to the respective first, second, and third input circuits, the core 20 is switched to induce an output pulse in the output coil 23, which is connected through the rectifier device 24 to the sum output terminals 25 and 26. At the same time, of course, the core 10 will also switch since the simultaneous application of three input pulses is more than enough to switch the core 10, which is arranged to require only two or more simultaneous energizations for the input coils 17, 18, and 19.

It will be remembered that the magnetic cores 30, 40, and 50 are not provided with any additional bias towards the negative remanence state. Therefore, if a binary bit input pulse is connected only across the first input circuit terminals 60 and 61 in the absence of both input pulses to the second and third input circuit terminals, the core 30 will switch from the negative to the positive remanence state to induce an output pulse in coil 33 across the sum output terminals 25 and 26. At the same time, cores 40 and 50 will not switch since their first input coils 47 and 57 are poled in the negative remanence direction. Also at this time, neither the core 10 or the core 20 will switch upon application of only one input pulse across one input circuit so that this binary bit condition is indicated by an output signal across the sum output terminals 25 and 26 alone with no signal across the carry output terminals 15, 16. Similarly, when a binary bit input pulse is applied across the second input circuit terminals 62 and 63 in the absence of binary bit pulses across the first and third input circuits, only the magnetic core 40 will switch from the negative to the positive remanence state to produce an output signal across the sum output terminals 25 and 26. And similarly, if a binary bit input pulse is applied only across the third input circuit terminals 64, 65 in the absence of binary bit input pulses across the first and second input circuits, only the magnetic core 50 will switch from the negative to the positive remanence state to induce an output pulse in the coil 53 to be connected across the sum output terminals 25 and 26.

It is, of course, understood that magnetic cores 10 and 20 will immediately switch back from the positive remanence state to the negative remanence state upon cessation of the applied input coil energizing pulses and the pulses thereby induced at that time in the output windings 13 or 23 might be undesirable. Therefore, the respective rectifying devices 14 and 24 are connected, as described, to prevent the passage of these undesired output pulses to the respective output terminals 15 and 16 or 25 and 26. Similarly, the cores 30, 40, or 50 may be reset to the normal negative remanence state by applying current pulses in the required direction to a selected one of the input coils associated therewith and, in such case, the rectifier diode 24 prevents the connection of the output pulse induced at that time to the sum output terminals 25 and 26.

A preferred arrangement of magnetic cores has been described in which five magnetic cores are used. It should be understood that a plurality of magnetic cores may be arranged with the requisite number of three input coils and two output coils, according to the teaching of the invention, to provide the full adder binary function, and that the preferred form of the invention, as described, is not necessarily the only arrangement that can be used within the scope of the appended claims.

What is claimed is:

1. A magnetic core full adder comprising first, second, third, fourth, and fifth magnetic cores capable of assuming a normal state of remanence or a switched state of remanence; a carry output coil inductively related to said first core and connected to carry output terminals, each of said second, third, fourth, and fifth cores having a respective sum output coil inductively related thereto; means for connecting said sum output coils in series with each other and to sum output terminals; each of said first, second, third, fourth, and fifth cores having first, second, and third input coils, respectively, inductively related thereto; first, second, and third sources of input current pulses to be added; means for connecting the first input coil of each of said cores in series with each other and to said first source; means for connecting the second input coil of each of said cores in series with each other and to said second source; and means for connecting the third input coil of each of said cores in series with each other and to said third source; means to bias said first core to its normal state of remanence and enable said first core to be switched to the switched state of remanence to produce an output pulse across said output terminals only when input pulses to at least two of the input windings related thereto are connected from said first, second, or third sources simultaneously; means to bias said second core to its normal state of remanence and to enable it to be switched to the switched state of remanence to produce an output pulse across said sum output terminals only when input pulses from said first, second, and third sources are simultaneously applied to all of said first, second, and third input coils related thereto; the inductive parameters of said third, fourth, and fifth magnetic cores and related coils being so chosen and related to the magnitude of the input current pulses to be added from said sources such as to switch said third core and produce an output pulse across said sum output terminals when an input pulse from the first source only in the absence of input pulses from said second and third sources is connected to the input windings related thereto; to switch the fourth core and produce an output pulse across said sum output terminals when an input pulse from the second source only in the absence of input pulses from said first and third sources is connected to the input coils related thereto; and to switch the fifth core and produce an output pulse across said sum output terminals when an input pulse from the third source only in the absence of input pulses from said first and second sources is connected to the input coils related thereto.

2. A magnetic core full adder comprising first, second, third, fourth, and fifth magnetic cores capable of assuming a normal state of remanence or a switched state of remanence; a carry output coil inductively related to said first core and connected to carry output terminals, each of said second, third, fourth, and fifth cores having a respective sum output coil inductively related thereto; means for connecting said sum output coils in series with each other and to sum output terminals; each of said first, second, third, fourth, and fifth cores having first, second, and third input coils, respectively, inductively related thereto; first, second, and third sources of input current pulses to be added; means for connecting the first input coil of each of said cores in series with each other and to said first source; means for connecting the second input coil of each of said cores in series with each other and to said second source; and means for connecting the third input coil of each of said cores in series with each other and to said third source; means to bias said first core to its normal state of remanence and enable said first core to be switched to the switched state of remanence to produce an output pulse across said output terminals only when input pulses to at least two of the input windings related thereto are connected from said first, second, or third sources simultaneously; means to bias said second core to its normal state of remanence and to enable it to be switched to the switched state of remanence to produce an output pulse across said sum output terminals only when input pulses from said first, second, and third sources are simultaneously applied to all of said first, second, and third input coils related thereto; the inductive parameters of the first input coil of said third core being chosen in relation to the magnitude of the input current pulse from the first source to cause said third core to switch from the normal state of remanence upon application of an input pulse from the first source and the inductive parameters of the second and third input coils of said third core with relation to the input current pulses from the second and third sources being chosen to maintain the normal remanence of the third core upon application of input pulses from said second and third sources; the inductive parameters of the second input coil of said fourth core being chosen in relation to the magnitude of the input current pulse from the second source to cause said fourth core to switch from the normal state of remanence upon application of an input pulse from the second source and the inductive parameters of the first and third input coils of said fourth core with relation to the input current pulses from the first and third sources being chosen to maintain the normal remanence of the fourth core upon application of input pulses from said first and third sources; and the inductive parameters of the third input coil of said fifth core being chosen in relation to the magnitude of the input current pulse from the third source to cause said fifth core to switch from the normal state of remanence upon application of an input pulse from the third source and the inductive parameters of the first and second input coils of said fifth core with relation to the input current pulses from the first and second sources being chosen to maintain the normal remanence of the fifth core upon application of input pulses from said first and second input coils; the switching of any of said third, fourth, or fifth cores producing an output pulse across said sum output terminals.

References Cited in the file of this patent

UNITED STATES PATENTS

| | | |
|---|---|---|
| 2,696,347 | Lo | Dec. 7, 1954 |
| 2,733,860 | Rajchman | Feb. 7, 1956 |
| 2,758,787 | Felker | Aug. 14, 1956 |
| 2,819,018 | Yetter | Jan. 7, 1958 |

FOREIGN PATENTS

| | | |
|---|---|---|
| 721,669 | Great Britain | Jan. 12, 1955 |
| 789,166 | Great Britain | Jan. 15, 1958 |